US012756105B2

(12) United States Patent
Huang et al.

(10) Patent No.: US 12,756,105 B2
(45) Date of Patent: Oct. 6, 2026

(54) ANTENNA STRUCTURE

(71) Applicant: PEGATRON CORPORATION, Taipei City (TW)

(72) Inventors: Chin-Ting Huang, Taipei City (TW); Yu-Hsuan Lin, Taipei City (TW); Hsi-Kai Hung, Taipei City (TW); Chih-Hui Hsu, Taipei City (TW); Chun-Kai Wang, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 19 days.

(21) Appl. No.: 19/017,781

(22) Filed: Jan. 13, 2025

(65) Prior Publication Data

US 2025/0337170 A1 Oct. 30, 2025

(30) Foreign Application Priority Data

Apr. 30, 2024 (TW) ................................ 113116128

(51) Int. Cl.
*H01Q 1/32* (2006.01)
*H01Q 5/335* (2015.01)
*H01Q 13/10* (2006.01)

(52) U.S. Cl.
CPC ........... *H01Q 13/106* (2013.01); *H01Q 5/335* (2015.01); *H01Q 1/3233* (2013.01)

(58) Field of Classification Search
CPC ........ H01Q 1/38; H01Q 1/3233; H01Q 5/335; H01Q 5/378; H01Q 5/385; H01Q 13/106; H01Q 13/206; H01Q 19/005; H01Q 21/0037; H01Q 21/0075; H01Q 21/065
See application file for complete search history.

(56) References Cited

U.S. PATENT DOCUMENTS 6,424,298 B1 * 7/2002 Nishikawa ........... H01Q 21/065 343/700 MS
9,768,512 B2 * 9/2017 Park ......................... H01Q 1/48
12,212,065 B2 * 1/2025 Sakurai .................. H01Q 21/20
12,412,990 B2 * 9/2025 Lee ....................... H01Q 13/206
2010/0026584 A1 * 2/2010 Nakabayashi ....... H01Q 21/065 343/893
2012/0112976 A1 * 5/2012 Hayakawa ............. H01Q 9/045 343/843

(Continued)

FOREIGN PATENT DOCUMENTS

CN 114389044 4/2022

*Primary Examiner* — Tung X Le
(74) *Attorney, Agent, or Firm* — J.C. PATENTS

(57) ABSTRACT

An antenna structure includes a substrate, a grounding surface and an antenna module. The substrate includes a first surface and a second surface. The antenna module is disposed on the second surface and includes a feeding point, a micro strip, n radiators and n coupling elements. The micro strip extends along a first axial direction and includes a first end, a second end, a first segment and a second segment. A width of the first segment is smaller than a width of the second segment. The n radiators are staggeredly connected to two sides of the micro strip along the first axial direction. The widths of the n radiators from the first end to the second end along the first axial direction are increased first and then decreased. The n coupling elements are separated from the micro strip and the n radiators.

10 Claims, 6 Drawing Sheets

(56) References Cited

U.S. PATENT DOCUMENTS

| | | | | |
|---|---|---|---|---|
| 2013/0027259 | A1* | 1/2013 | Fujita | H01Q 13/206 343/731 |
| 2017/0373402 | A1* | 12/2017 | Chung | H01Q 21/0075 |
| 2019/0067834 | A1* | 2/2019 | Park | H01Q 5/385 |
| 2023/0031609 | A1* | 2/2023 | Russo | H01P 5/1007 |

* cited by examiner

ANTENNA STRUCTURE

CROSS-REFERENCE TO RELATED APPLICATION

This application claims the priority benefit of Taiwan application serial no. 113116128, filed on Apr. 30, 2024. The entirety of the above-mentioned patent application is hereby incorporated by reference herein and made a part of this specification.

BACKGROUND

Technology Field

The disclosure relates to an antenna structure, and particularly relates to an antenna structure with a small difference between the maximum energy and the minimum energy on radiation field pattern.

Description of Related Art

When a conventional Taylor radar antenna is used for a vehicle short-range radar (SRR), a large difference between its maximum energy and its minimum energy on the radiation field pattern is found. When it happens, an object detected by the radar will be easily distorted. Therefore, when the Taylor radar antenna is used for the vehicle short-range radar, how to avoid distortion of objects detected by the radar is a topic devoted to discussion in this field.

SUMMARY

The disclosure is directed to an antenna structure with a small difference in the maximum and the minimum radiation field pattern energy.

The disclosure provides an antenna structure including a substrate, a grounding surface and an antenna module. The substrate includes a first surface and a second surface opposite to each other. The grounding surface is disposed on the first surface, and the antenna module is disposed on the second surface, and includes a feeding point, a micro strip, n radiators and n coupling elements. The micro strip extends along a first axial direction and includes a first end and a second end opposite to each other, a first segment and a second segment located between the first end and the second end, wherein the first end is connected to the feeding point, and a width of the first segment is smaller than a width of the second segment. The n radiators are staggeredly connected to two sides of the micro strip along the first axial direction, wherein n is an even number, and counted from the first end, multiple odd-numbered radiators of the n radiators extend from one of the two sides of the micro strip in a second axial direction, and multiple even-numbered radiators of the n radiators extend from the other side of the micro strip in an opposite direction of the second axial direction, the odd-numbered radiators are staggered with the even-numbered radiators, and multiple widths of the n radiators from the first end to the second end along the first axial direction are increased first and then decreased. The n coupling elements are spaced apart from the micro strip and the n radiators. Multiple odd-numbered coupling elements of the n coupling elements are disposed on one of the two sides of the micro strip, and multiple even-numbered coupling elements of the n coupling elements are disposed on the other one of the two sides of the micro strip.

In an embodiment of the disclosure, the first to the n/2th radiators of the n radiators, counted from the first end are connected to the first segment, and the (n/2+1)th to the nth radiators of the n radiators are connected to the second segment.

In an embodiment of the disclosure, the antenna module further includes m matching elements extending from the micro strip along the second axial direction.

In an embodiment of the disclosure, the m matching elements are disposed opposite the odd-numbered radiators of the n radiators, or the m matching elements are disposed opposite the even-numbered radiators of the n radiators, or the m matching elements are disposed opposite the n radiators.

In an embodiment of the disclosure, the n radiators have same lengths in the second axial direction.

In an embodiment of the disclosure, the antenna module is excited at a frequency band, and the lengths of the n radiators are 0.5 times of a wavelength of the frequency band.

In an embodiment of the disclosure, distances in the first axial direction between every two adjacent radiators of the n radiators are the same.

In an embodiment of the disclosure, the antenna module is excited at a frequency band, and the distances are 0.5 times of a wavelength of the frequency band.

In an embodiment of the disclosure, the width of an (a+1)th radiator of the n radiators is the same as the width of an (n−a)th radiator, $a=0\sim n/2-1$.

In an embodiment of the disclosure, from the first end to the second end, the widths of the n radiators are distributed by coefficients of Taylor polynomial.

In an embodiment of the disclosure, the first to the n/2th coupling elements of the n coupling elements, counted from the first end, are disposed by the sides facing the first end of the n/2th radiators of the n radiators, and an (n/2+1)th to the nth coupling elements are disposed by the sides facing the second end of the (n/2+1)th to the nth radiator of the n radiators.

Based on the above description, the antenna module of the antenna structure of the disclosure includes the micro strip, the n radiators and the n coupling elements. The width of the first segment of the micro strip is less than the width of the second segment. The n radiators are staggeredly connected to the two sides of the micro strip, and the widths of the n radiators from the first end to the second end are increased first and then decreased. The n coupling elements are spaced apart from the micro strip and the n radiators, and some of the n coupling elements are located on one side of the micro strip and the others of the n coupling elements are located on the other side of the micro strip. Accordingly, a small difference between the maximum energy and the minimum energy on radiation field pattern of the antenna structure of the disclosure is achieved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
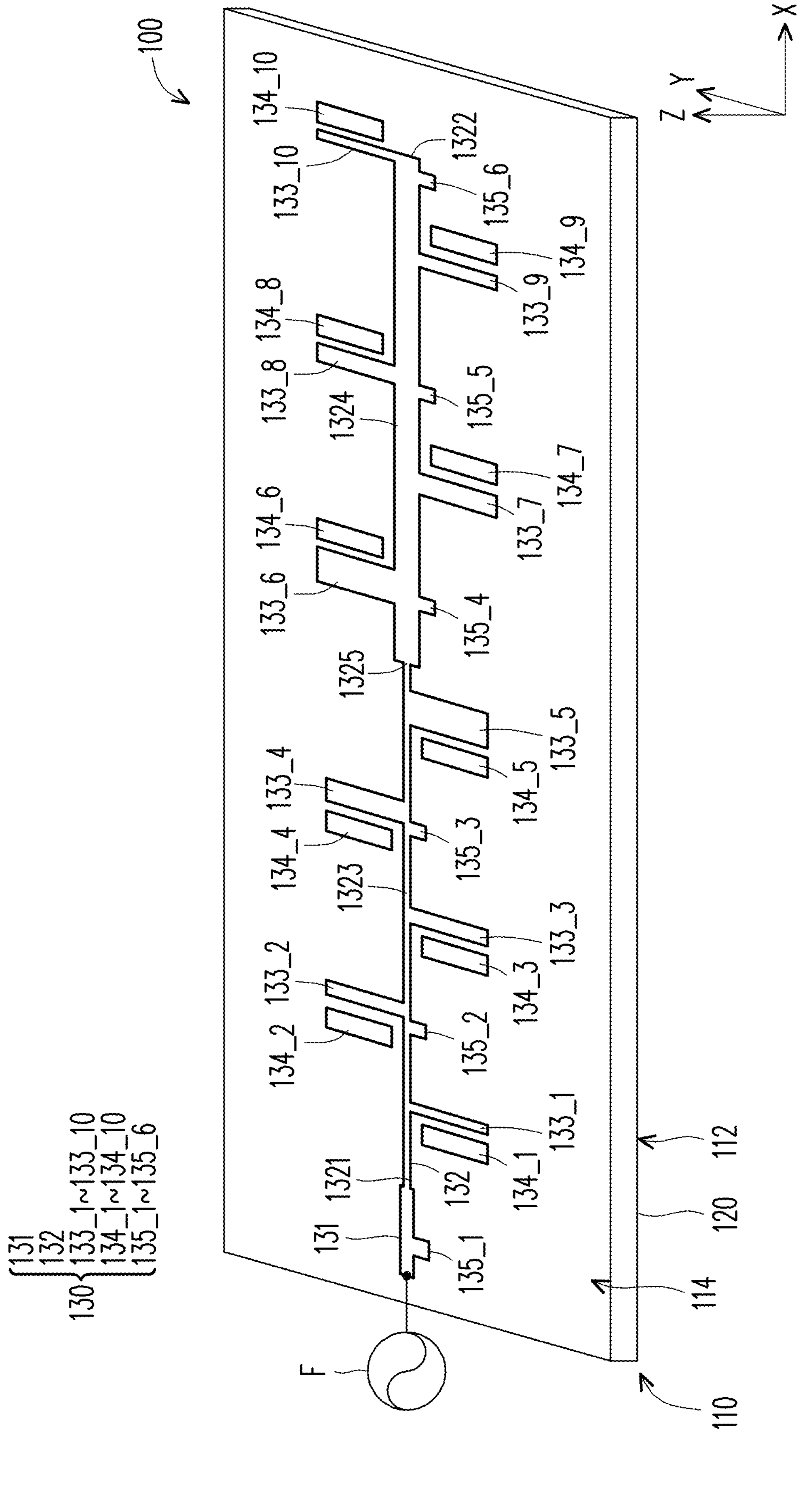
FIG. 1A is a schematic diagram of an antenna structure according to an embodiment of the disclosure.

FIG. 1A is a schematic diagram of an antenna structure according to an embodiment of the disclosure. Referring to FIG. 1A, an antenna structure 100 of the embodiment is, for example, a new design of a coupling wideband Taylor radar antenna, including a substrate 110, a grounding surface 120 and an antenna module 130. The substrate 110 is, for example, a non-conductive dielectric substrate and includes a first surface 112 and a second surface 114 opposite to each other. The grounding surface 120 is, for example, provided on the entire first surface 112. The antenna module 130 is disposed on the second surface 114, and a projection thereof onto the first surface 112 is located within the grounding surface 120.

As shown in FIG. 1A, the antenna module 130 includes a feeding point 131, a micro strip 132, n radiators **133_1-133_*n* and n coupling elements 134_1-134_*n***. In the embodiment, the number of n is ten, but in other embodiments, the number of the radiators and the coupling elements may also be any even number, such as two, four, eight or twelve. The disclosure does not limit the number of the radiators and the coupling elements.

In the embodiment, a frequency band of the antenna module 130 ranges 76 GHZ-81 GHz, but the frequency band of the antenna module 130 is not limited thereto.

Referring to FIG. 1A, the micro strip 132 extends along a first axial direction X and includes a first end 1321 and a second end 1322 opposite to each other, a first segment 1323 and a second segment 1324 located between the first end 1321 and the second end 1322. In the embodiment, the first end 1321 is connected to one side of the feeding point 131, the first segment 1323 is located between the first end 1321 and a center point 1325 of the micro strip 132, and the second segment 1324 is located between the second end 1322 and the center point 1325. In the embodiment, the other side of the feeding point 131 is connected to a signal source F, and an impedance of the feeding point 131 is 50 ohms, but the disclosure does not limit the impedance of the feeding point 131.

Figure 1B:
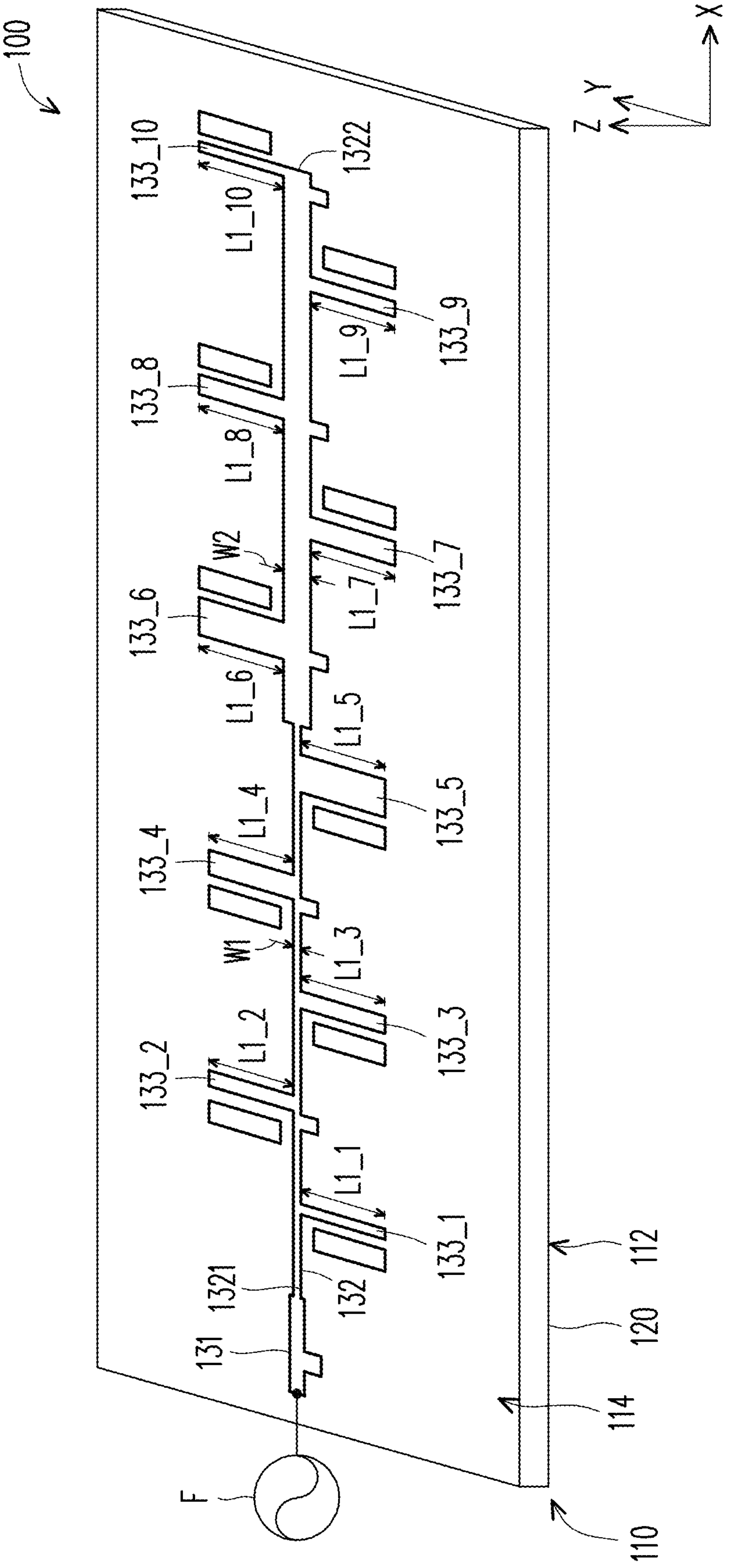
FIG. 1B illustrates lengths of radiators and widths of a first segment and a second segment of a microstrip in FIG. 1A.

FIG. 1B illustrates lengths of the radiators and widths of the first segment and the second segment of the microstrip 132 in FIG. 1A. As shown in FIG. 1A and FIG. 1B, a width W1 of the first segment 1323 is smaller than a width W2 of the second segment 1324. Through the aforementioned configuration of the widths of the antenna structure 100, an impedance of the second segment 1324 is smaller than an impedance of the first segment 1323. Such design may increase current intensity of the second end 1322 and evenly distribute an overall current distribution, thereby equalizing its radiation field pattern. In the embodiment, the impedance of the first segment 1323 is 84 ohms, and the impedance of the second segment 1324 is 70 ohms, but the disclosure is not limited thereto.

Referring to FIG. 1A, ten radiators 133_1-133_10 (i.e., n=10) are staggeredly connected to two sides of the micro strip 132 along the first axial direction X. Counted from the first end 1321, multiple odd-numbered radiators 133_1, 133_3, 133_5, 133_7, 133_9 of the 10 radiators 133_1-133_10 extend from one of the two sides of the micro strip 132 in a second axial direction Y, and multiple even-numbered radiators 133_2, 133_4, 133_6, 133_8, 133_10 extend from the other side of the micro strip 132 in an opposite direction of the second axial direction Y. Moreover, the odd-numbered radiators 133_1, 133_3, 133_5, 133_7, and 133_9 are staggered with the even-numbered radiators 133_2, 133_4, 133_6, 133_8, and 133_10. In the embodiment, a third axial direction Z is perpendicular to the first axial direction X and the second axial direction Y, but the disclosure is not limited thereto.

In the embodiment, the first to fifth radiators 133_1-133_5 of the ten radiators 133_1-133_10 are connected to the first segment 1323, and the sixth to the tenth radiators 133_6-133_10 are connected to the second segment 1324.

Figure 1C:
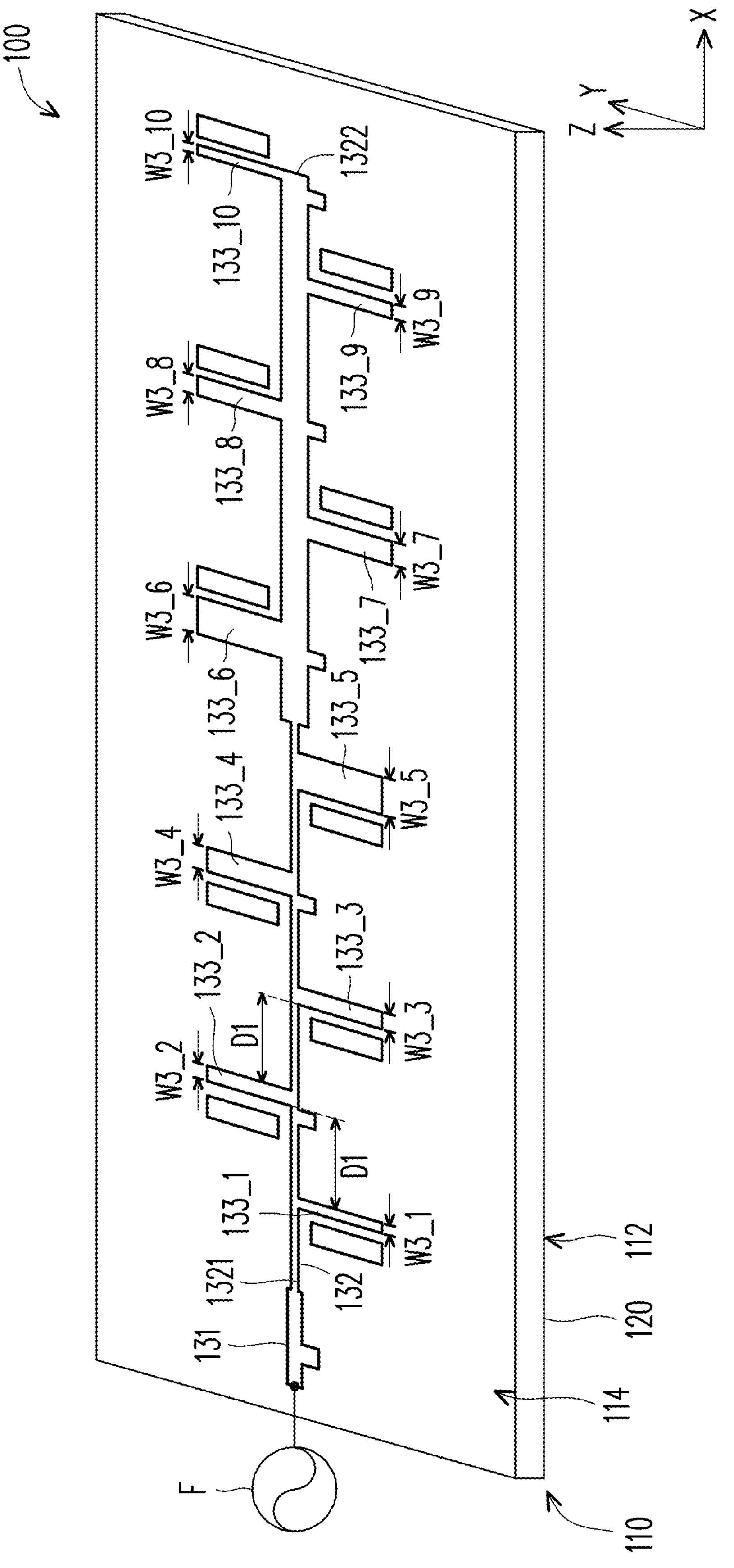
FIG. 1C illustrates widths of the radiators and distances between one and another radiator in FIG. 1A.

FIG. 1C illustrates widths of the radiators in FIG. 1A and distances between one another radiator. Referring to FIG. 1C, multiple widths W3_1-W3_10 of the ten radiators 133_1-133_10 from the first end 1321 to the second end 1322 along the first axial direction X are increased first and then decreased. Moreover, the width of the (a+1)th radiator counted from the first end 1321 of the ten radiators 133_1-133_10 is the same as the width of the (10−a)th radiator, and a=0-4.

In detail, the width W3_1 of the first radiator 133_1 is the same as the width W3_10 of the tenth radiator 133_10, the width W3_2 of the second radiator 133_2 is the same as the width W3_9 of the ninth radiator 133_9, the width W3_3 of the third radiator 133_3 is the same as the width W3_8 of the eighth radiator 133_8, the width W3_4 of the fourth radiator 133_4 is the same as the width W3_7 of the seventh radiator 133_7, and the width W3_5 of the fifth radiator 133_5 is the same as the width W3_6 of the sixth radiator 133_6.

Table 1 is a comparison table of the widths of the radiators and the coefficients of Taylor polynomial and impedance values. Referring to FIG. 1C and Table 1, in the embodiment, the widths W3_1-W3_10 of the ten radiators 133_1-133_10 from the first end 1321 to the second end 1322 adopt the coefficients of Taylor polynomial to design a sidelobe level (SLL), but not limited thereto. In addition, in the embodiment, the sidelobe level is −20 dB, but the disclosure is not limited thereto.

TABLE 1 comparison table of the widths of the radiators and the coefficients of Taylor

| Radiator | Chebyshev coefficient | Impedance value (ohm) | Width (cm) | |
|---|---|---|---|---|
| 133_1 | 0.38 | 93.00 | W3_1 | 0.10 |
| 133_2 | 0.51 | 68.62 | W3_2 | 0.14 |
| 133_3 | 0.72 | 49.29 | W3_3 | 0.20 |
| 133_4 | 0.90 | 39.33 | W3_4 | 0.27 |
| 133_5 | 1.00 | 35.32 | W3_5 | 0.32 |
| 133_6 | 1.00 | 35.32 | W3_6 | 0.32 |
| 133_7 | 0.90 | 39.33 | W3_7 | 0.27 |
| 133_8 | 0.72 | 49.29 | W3_8 | 0.20 |
| 133_9 | 0.51 | 68.62 | W3_9 | 0.14 |
| 133_10 | 0.38 | 93.00 | W3_10 | 0.10 |

polynomial and impedance values

Referring to FIG. 1B, in an embodiment of the disclosure, the lengths L1_1-L1_10 of the ten radiators 133_1-133_10 in the second axial direction Y are the same. In the embodiment, these lengths L1_1-L1_10 are 0.5 times of a wavelength of a frequency band (for example, 78.5 GHz) at which the antenna module 130 is excited.

Referring to FIG. 1C, distances D1 of every two adjacent radiators of the ten radiators 133_1-133_10 in the first axial direction X are the same. To be specific, a gap between two radiators with adjacent ordinal numbers of the ten radiators 133_1 to 133_10 in the first axial direction X is defined as the distance D1, and these distances D1 are the same. For example, the distance D1 between the first radiator 133_1 and the second radiator 133_2 in the first axial direction X is the same as the distance D1 between the second radiator 133_2 and the third radiator 133_3 in the first axial direction X. The distance D1 between the second radiator 133_2 and the third radiator 133_3 in the first axial direction X is the same as the distance D1 between the third radiator 133_3 and the fourth radiator 133_4 in the first axial direction X, and so on. In the embodiment, the distance D1 is 0.5 times of the wavelength of the frequency band (for example, 78.5 GHZ) at which the antenna module 130 is excited.

Referring to FIG. 1A, the ten coupling elements 134_1-134_10 are separated from the micro strip 132 and the ten radiators 133_1-133_10. Multiple odd-numbered coupling elements 134_1, 134_3, 134_5, 134_7, 134_9 of the ten coupling elements 134_1-134_10 are disposed on one of the two sides of the micro strip 132, and multiple even-numbered coupling elements 134_2, 134_4, 134_6, 134_8, 134_10 of the ten coupling elements 134_1-134_10 are disposed on the other side of the micro strip 132. In addition, in the embodiment, counted from the first end 1321, the first to the fifth coupling elements 134_1-134_5 of the ten coupling elements 134_1-134_10 are separated from and by the sides facing the first end 1321 of the first to the fifth radiators 133_1-133_5 of the ten radiators 133_1-133_10, and the sixth to the tenth coupling elements 134_6-134_10 are separated from and by the sides facing the second end 1322 of the sixth to the tenth radiators 133_6-133_10 of the ten radiators 133_1-133_10.

It should be noted that the antenna structure 100 adopts the configuration of the ten radiators 133_1-133_10 and the ten coupling elements 134_1-134_10 to make the radiation field pattern closer to the centre point 1325.

In the embodiment, the number of coupling elements next to each of the radiators 133_1-133_10 is one, but the disclosure is not limited thereto. In other embodiments, the number of the coupling pieces next to each of the radiators 133_1-133_10 may also be plural.

Referring to FIG. 1A, the antenna module 130 further includes m matching elements 135_1-135_*m* extending from the micro strip 132 in the direction opposite to the second axial direction Y, and located on the other side of the micro strip 132 opposite multiple radiators of the ten radiators 133_1-133_10. In the embodiment, the number of m is 6, that is, the plurality of matching elements are matching elements 135_1 to 135_6, but the disclosure is not limited thereto.

In the embodiment, the matching element 135_1 is located next to the feeding point 131, and the matching elements 135_1-135_6 are disposed on the other side of the micro strip 132 opposite the even-numbered radiators 133_2, 133_4, 133_6, 133_8, 133_10 of the ten radiators 133_1-133_10, but the disclosure is not limited thereto. In other embodiments, the matching elements may also be disposed opposite the odd-numbered radiators of the radiators, or the matching elements may be disposed opposite all of the radiators.

It should be noted that the antenna structure 100 may adjust an operational frequency impedance by disposing the matching elements 135_1-135_6, so as to achieve a broadband effect. In the embodiment, the operating frequency impedance is 50 ohms, but the disclosure is not limited thereto.

Figure 2:
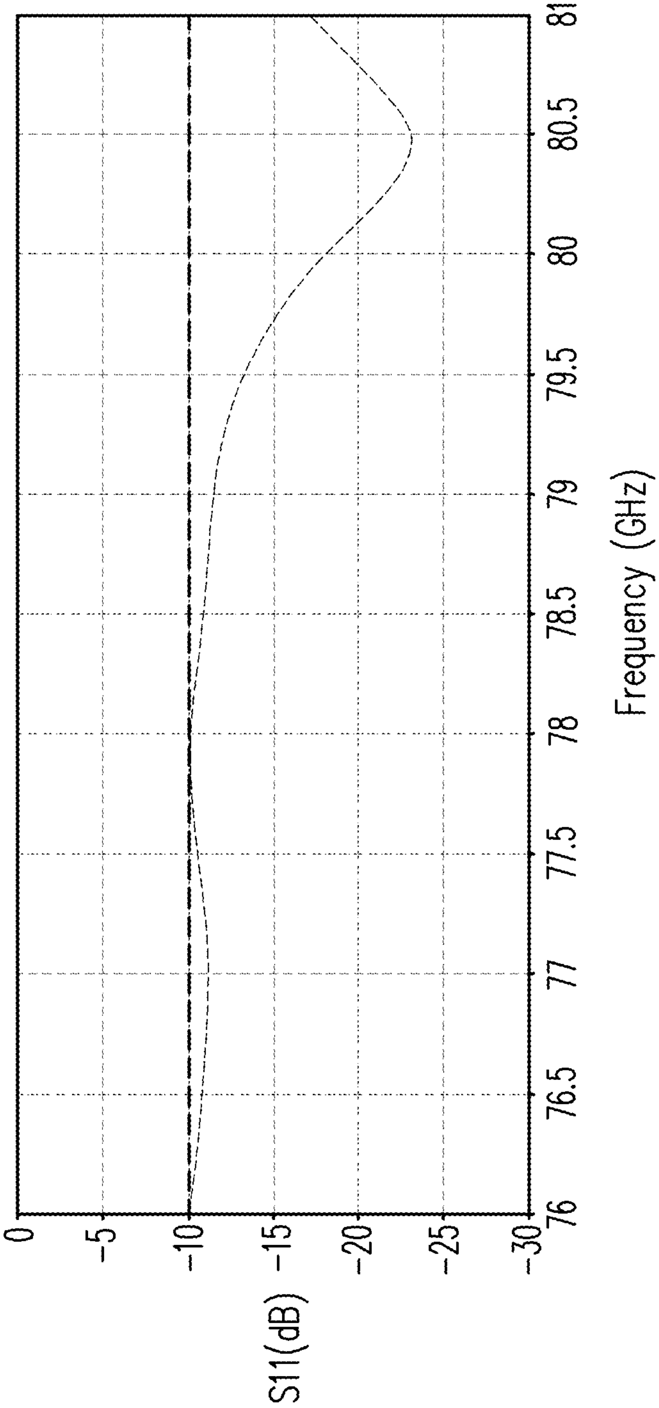
FIG. 2 is a plot diagram illustrating a relationship between frequency and S11 of the antenna structure of the embodiment.

FIG. 2 is a plot diagram illustrating a relationship between frequency and S11 of the antenna structure of the embodiment. Referring to FIG. 2, S11 parameter of the antenna structure 100 of the embodiment may reach an industrial standard of −10 dB at the operational frequency of 76 GHz to 81 GHz, thus having good antenna performance and meeting bandwidth requirements of automotive radars for long-distance and short-distance detection.

Figure 3:
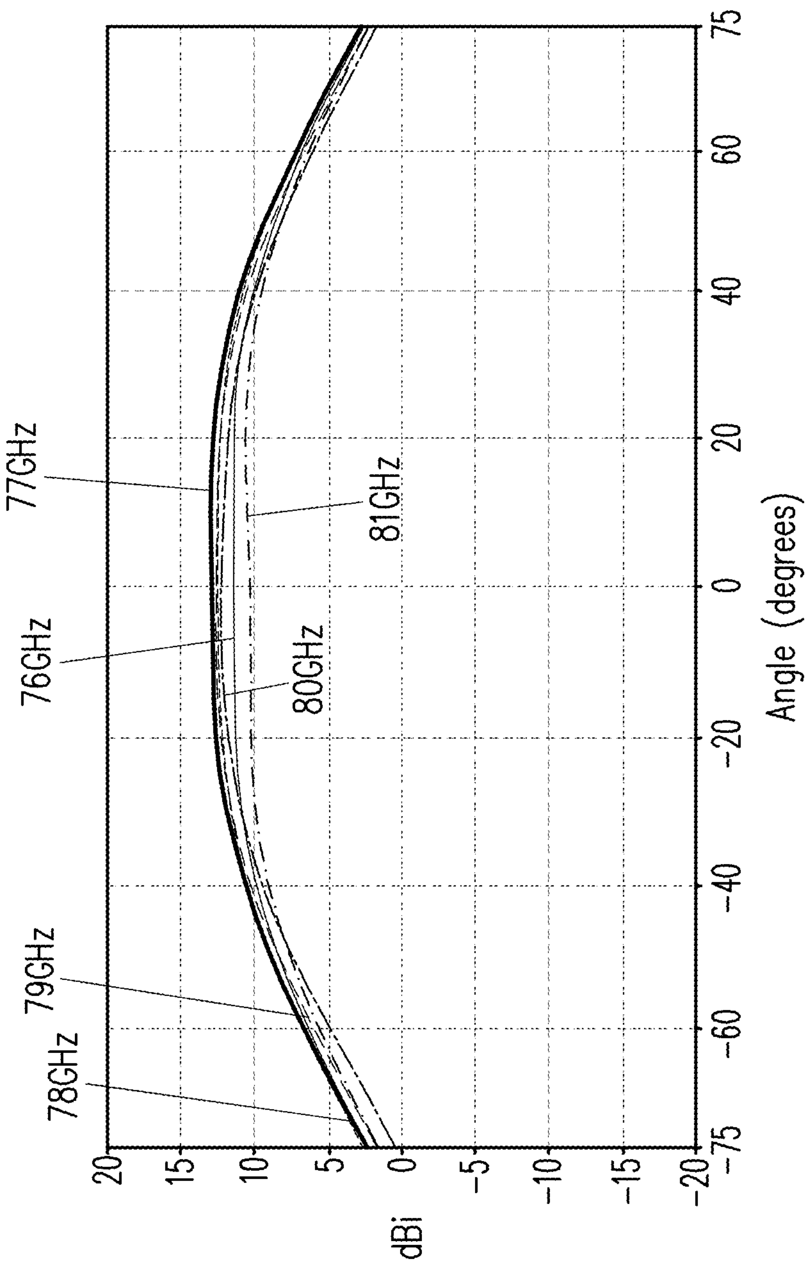
FIG. 3 is a radiation field pattern on YZ plane of the antenna structure of the embodiment.

FIG. 3 is a radiation field pattern of a YZ plane of the antenna structure of the embodiment. Referring to FIG. 3, when the antenna structure 100 of the embodiment operates at the operational frequency of 76 GHz to 81 GHZ, the difference between the maximum energy and the minimum energy on the radiation field pattern energy is below 2 dB at an angle of zero degree, and the difference between the maximum energy and the minimum energy on the radiation field pattern energy is below 3 dB at an angle of +/−75 degrees, which has good antenna performance.

Figure 4:
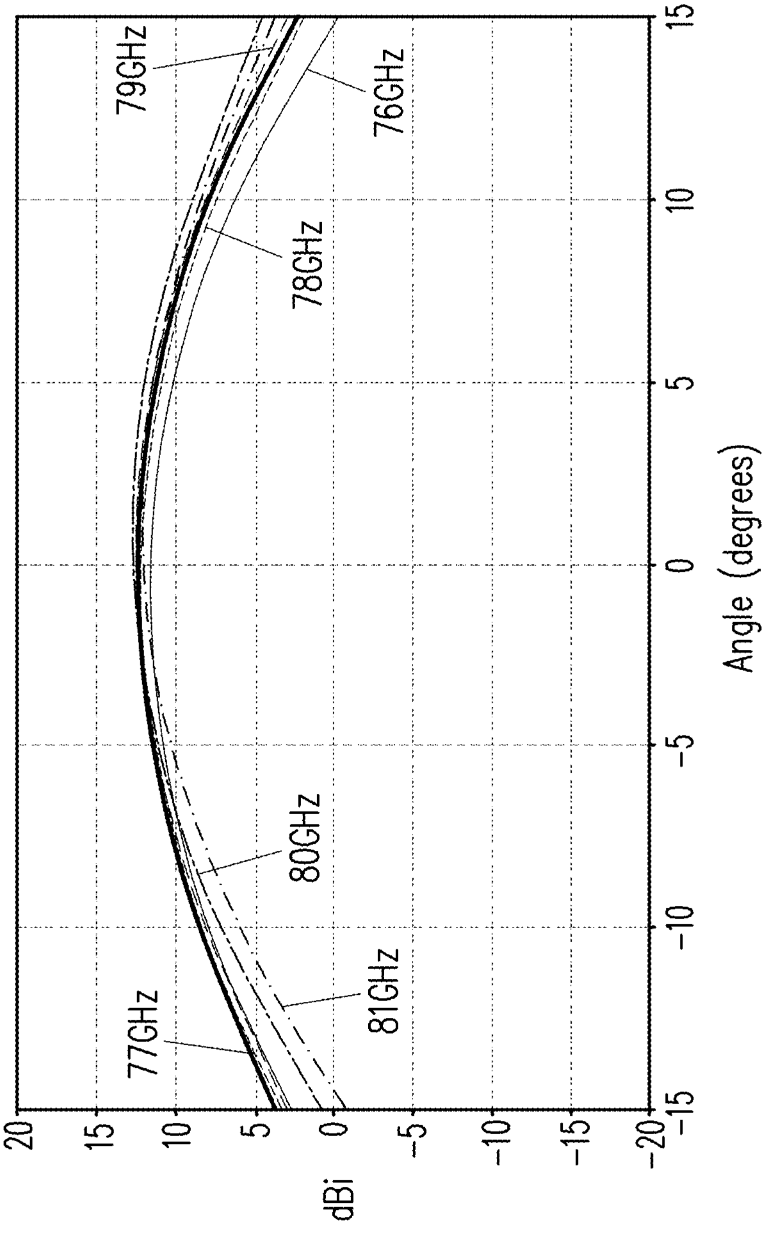
FIG. 4 is a radiation field pattern on XZ plane of the antenna structure of the embodiment.

FIG. 4 is a radiation field pattern on XZ plane of the antenna structure of the embodiment. Referring to FIG. 4, when the antenna structure 100 of the embodiment operates at the operational frequency of 76 GHz to 81 GHZ, the difference between the maximum energy and the minimum radiation energy on the radiation field pattern energy is below 2 dB at an angle of zero degree, and the difference between the maximum energy and the minimum energy on the radiation field pattern energy is below 5 dB at an angle of +/−15 degrees, which has good antenna performance.

In summary, the antenna module of the antenna structure of the disclosure includes a micro strip, n radiators and n coupling elements. A width of a first segment of the micro strip is less than a width of a second segment. The n radiators are staggeredly connected to the two sides of the micro strip, and the widths of the n radiators from the first end to the second end are increased first and then decreased. The n coupling elements are spaced apart from the micro strip and the n radiators, and are located by the n radiators. In an embodiment, the widths of the n radiators are distributed by the coefficients of Taylor polynomial. Accordingly, the antenna structure of the disclosure has a broadband effect, and the difference between the maximum energy and the minimum energy on the radiation field pattern energy is considerably small.

What is claimed is:

1. An antenna structure, comprising:

a substrate, comprising a first surface and a second surface opposite to each other;

a grounding surface, disposed on the first surface; and an antenna module, disposed on the second surface and comprising:

a feeding point;

a micro strip, extending along a first axial direction and comprising a first end and a second end opposite to each other, a first segment and a second segment located between the first end and the second end, wherein the first end is connected to the feeding point, and a width of the first segment is smaller than a width of the second segment;

n radiators, staggeredly connected to two sides of the micro strip along the first axial direction, wherein n is an even number, counted from the first end, a plurality of odd-numbered radiators of the n radiators extends from one of the two sides of the micro strip in a second axial direction, and a plurality of even-numbered radiators of the n radiators extends from the other one of the two sides of the micro strip in an opposite direction of the second axial direction, the odd-numbered radiators are staggered with the even-numbered radiators, and a plurality of widths of the n radiators from the first end to the second end along the first axial direction is increased first and then decreased; and n coupling elements, spaced apart from the micro strip and the n radiators, wherein a plurality of odd-numbered coupling elements of the n coupling elements is disposed on one of the two sides of the micro strip, and a plurality of even-numbered coupling elements of the n coupling elements is disposed on the other one of the two sides of the micro strip, wherein the first to the n/2th coupling elements of the n coupling elements, counted from the first end, are disposed by the sides facing the first end of the first to the n/2th radiators of the n radiators, and an (n/2+1)th to the nth coupling elements are disposed by the sides facing the second end of the (n/2+1)th of the n radiators.

2. The antenna structure according to claim 1, wherein the first to the n/2th radiators of the n radiators, counted from the first end, are connected to the first segment, and the (n/2+1)th to the nth radiators of the n radiators are connected to the second segment.

3. The antenna structure according to claim 1, wherein the antenna module further comprises m matching elements extending from the micro strip along the second axial direction.

4. The antenna structure according to claim 3, wherein the m matching elements are disposed opposite the odd-numbered radiators of the n radiators, or the m matching elements are disposed opposite the even-numbered radiators of the n radiators, or the m matching elements are disposed opposite the n radiators.

5. The antenna structure according to claim 1, wherein the n radiators have same lengths in the second axial direction.

6. The antenna structure according to claim 5, wherein the antenna module is excited at a frequency band, and the lengths of the n radiators are 0.5 times of a wavelength of the frequency band.

7. The antenna structure according to claim 1, wherein distances in the first axial direction between every two adjacent radiators in the n radiators are the same.

8. The antenna structure according to claim 7, wherein the antenna module is excited at a frequency band, and the distances are 0.5 times of a wavelength of the frequency band.

9. The antenna structure according to claim 1, wherein the width of an (a+1)th radiator of the n radiators is the same as the width of an (n−a)th radiator, a=0~n/2−1.

10. The antenna structure according to claim 1, wherein from the first end to the second end, the widths of the n radiators are distributed by coefficients of Taylor polynomial.

* * * * *